(No Model.)
M. M. GREEN.
HARROW.
No. 438,920.          Patented Oct. 21, 1890.
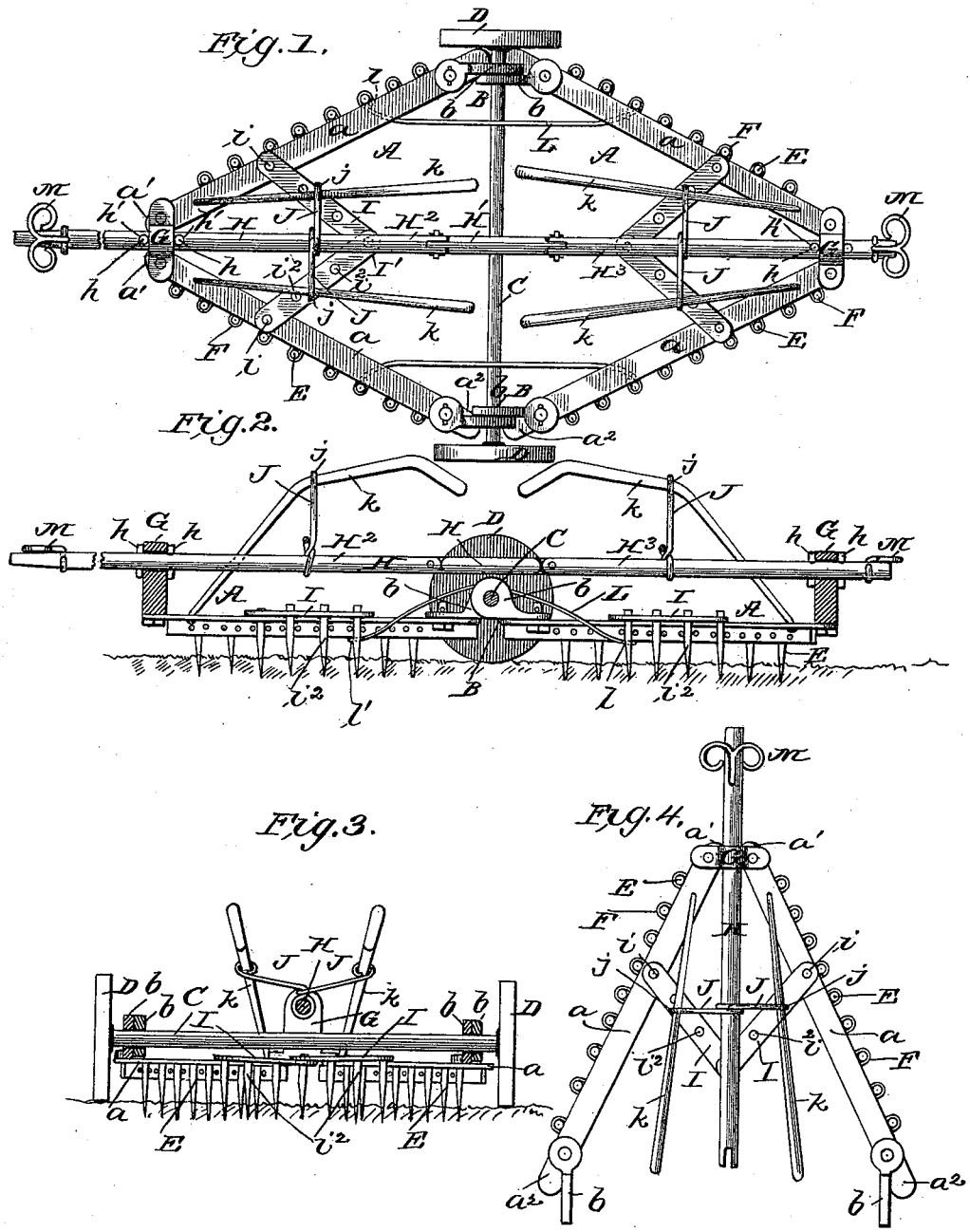
WITNESSES
Fred J. Dieterich
Jos. A. Ryan
INVENTOR:
Marion M. Green
BY 
ATTORNEYS

UNITED STATES PATENT OFFICE.

MARION M. GREEN, OF COUNTY LINE, TENNESSEE.

HARROW.

SPECIFICATION forming part of Letters Patent No. 438,920, dated October 21, 1890.

Application filed June 4, 1890. Serial No. 354,293. (No model.)

*To all whom it may concern:*

Be it known that I, MARION M. GREEN, residing at County Line, in the county of Moore and State of Tennessee, have invented certain new and useful Improvements in Harrows, of which the following is a specification.

My invention has for its object to provide a harrow which will be simple in construction, cheap as to cost, and very effective for its desired purpose; and it consists in the sundry novel arrangements and combination of parts, all of which will be hereinafter fully described, and particularly pointed out in the claims, reference being had to the accompanying drawings, in which—

Figure 1 is a top plan view of my improved harrow. Fig. 2 is a longitudinal section thereof. Fig. 3 is a similar view showing the harrow folded, and Fig. 4 is a plan view of one section of the harrow.

My improved harrow is formed of two L-shaped sections A A, hinged together to form a diamond shape, each section consisting of the side bars $a\,a$, connected at $a'\,a'$, as shown. To the ends $a^2\,a^2$ of each of the bars $a\,a$ is secured a hinged section $b\,b$, which forms bearings B for a transverse axle C, upon the outer ends of which supporting-wheels D are mounted, as shown. Said wheels, however, may be omitted, if desired.

To each of the bars $a$ the harrow or plow teeth E are secured in any suitable manner, preferably by means of the clips F. Upon the outer ends $a'$ of the arms $a$ is secured a clip or collar G, which forms the bearings for a longitudinal draft-bar H, which is held from longitudinal movement by means of the stop-pins $h\,h$, passed through apertures $h'\,h'$ in the bar to each side of the bearings G G, as shown. The bar H is formed with a jointed central portion H', whereby the sections $H^2\,H^3$ of said bar are adapted to be folded together for a purpose presently described.

I denotes transverse bars connected at $i$ to the side bars $a\,a$ and are jointed at I', said bars forming transverse harrow-sections, being provided with teeth $i^2$, as shown.

J J indicate brace-rods secured upon the draft-bar H, the ends $j\,j$ of which form supports for the handles K K, the lower ends of which are connected with the side bars $a\,a$, as shown.

L L indicate iron rods bent at $l\,l$ and formed with loops $l'\,l'$, said rods serving as supports for the frames A to hold the teeth out of the ground when the harrow is moved about the field. In placing said bar in position the same is laid over the axle, as shown in dotted lines in Fig. 1, and the looped ends slipped over a pair of the harrow-teeth, the spring of the bar L serving to lift the ends of >-shaped sections A and hold same from operative position.

On each end of the draft-bar H is formed a double clevis M, by means of which the draft can be applied so that the teeth will operate to cut at an angle to the line of draft.

My improved harrow is adapted to be worked both ways, as the teeth or plows have a sufficient cutting-edge either way, and by forming the body into diamond shape and providing the transverse harrow-sections it will serve to cut up the soil into fine lumps. If desired, the front section may be formed with plow-like teeth to cut into and break the soil and the rear section with the straight harrow-teeth to pulverize the same. By forming the harrow in sections one section may be folded over the other, as shown in Fig. 4, in case a light draft is desired, or the sections may be detached and used separately.

My improved harrow is very simple and yet strong in construction, and is adapted for heavy as well as light work.

Having thus described my invention, what I claim, and desire to secure by Letters Patent, is—

1. In a harrow, the combination, substantially as described, of the >-shaped sections formed of the side bars $a\,a$, each formed with a hinged member on their ends $a^2\,a^2$, a transverse axle journaled in said hinged members, a collar or sleeve held on the ends $a'$ of the sections $a\,a$, a longitudinal bar H, formed with draft devices at each end, journaled in said sleeves, and means for holding said bar from longitudinal movement, said bar provided with a jointed section, substantially as and for the purpose described.

2. In a harrow essentially as described, the combination, with the hinged sections carrying the teeth, of the rod or support L, formed with the loops $l\,l$, substantially as and for the purpose described.

MARION M. GREEN.

Witnesses:
J. T. BICKLEY,
B. E. SPENCER.